United States Patent Office 3,539,600
Patented Nov. 10, 1970

3,539,600
PROCESS FOR THE DEHYDROBROMINATION OF 3-KETO-2,4-DIHALOGENO STEROIDS
Herbert A. Gerber, Mount Freedom, and Howard E. Harris, Bloomfield, N.J., assignors to Schering Corporation, Bloomfield, N.J., a corporation of New Jersey
No Drawing. Continuation-in-part of application Ser. No. 698,133, Jan. 16, 1968. This application Dec. 11, 1968, Ser. No. 783,114
Int. Cl. C07c *167/14*
U.S. Cl. 260—397.47          10 Claims

ABSTRACT OF THE DISCLOSURE

This invention relates to an improved process for dehydrohalogenating 3 - keto - 2,4 - dihalogeno steroids in a medium comprising a basic salt, a tertiary amide, water up to about 10% of the volume of the tertiary amide and optically a lithium halide; said basic salt being a carbonate or an oxide having an alkali metal or an alkaline earth metal cation.

---

This application is a continuation-in-part of copending application No. 698,133 filed Jan. 16, 1968 now abandoned.

This invention relates to an improved process for preparing 3-keto-$\Delta^{1,4}$ steroids by dehydrohalogenating the corresponding 3-keto-2,4-dihalogeno steroids.

Many methods for preparing 3-keto-$\Delta^{1,4}$ steroids by dehydrohalogenating the corresponding 2,4-dihalogeno steroid are known in the art. A great number of the methods for preparing and dehydrohalogenating 3-keto-2,4-dihalogeno steroids are referred to in Djerassi's "Steroid Reactions" (1963), Holden Day Inc., San Francisco, Calif. (U.S.A).

One such useful prior art process for dehydrohalogenating a 3-keto-2,4-dihalogeno steroid comprises heating the steroid in an anhydrous medium comprising a tertiary amide and a lithium halide until dehydrohalogenation is substantially complete.

Another preferred prior art process for preparing 3-keto-$\Delta^{1,4}$ steroids comprises heating a 3-keto-2,4-dihalogeno steroid in an anhydrous medium comprising a tertiary amide and a lithium halide-lithium carbonate couple until dehydrohalogenation is substantially complete (as described in U.S. Pat. No. 2,923,721).

All these prior art processes require that the rehydrohalogenation should be carried out in a substantially anhydrous medium.

Although the prior art processes are easy to perform, they give rise to varying and unpredictable amounts of the undesired 3-keto-$\Delta^{4,6}$ isomer and therefore necessitate further time consuming and costly processing in order to effect a separation of the isomeric products. Further, the process employing the lithium halide in the absence of the basic salt does not always give a substantially complete reaction.

A process has now been discovered by means of which the dehydrohalogenation may be effected with the formation of significantly decreased quantities of the isomeric 3-keto-$\Delta^{4,6}$ compound. Moreover, this novel dehydrohalogenation process may be effected in the absence of a lithium halide salt, although such a salt in the reaction mixture is advantageous. Another advantage of the process of this invention is that it permits the reaction to be performed at higher concentrations than those of the prior art methods, thereby permitting the processing of larger quantities of steroid without increasing the size of the equipment used for the reaction. Moreover, it has also been discovered that, in addition to those basic salts taught for the prior art processes, other basic salts may be advantageously used in the novel process.

According to the invention, therefore, there is provided a process for preparing a 3-keto-$\Delta^{1,4}$ steroid which comprises dehydrohalogenating a 3-keto-2,4-dihalogeno steroid in a medium comprising a basic salt which is a carbonate or oxide of an alkali or alkaline earth metal, a tertiary amide, and water in an amount up to about 10% of the volume of the tertiary amide, to yield the corresponding 3-keto-$\Delta^{1,4}$ steroid. The process may be represented schematically as follows, only rings A and B of the steroid being shown:

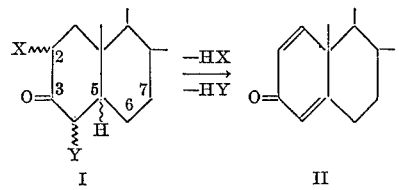

wherein X and Y represent halogen atoms which may or may not be identical, but are preferably both bromine. As is customary, the use of a wavy line to represent the bonding of the halogens to the steroid nucleus denotes that the halogen may be either axially or equatorially oriented. In like manner, such a line at the AB ring junction denotes an optional cis or trans ring fusion (i.e. either a 5$\alpha$-allo or a 5$\beta$-normal configuration).

It is particularly preferred to carry out the process of this invention in the presence of a lithium halide having a molecular weight greater than 26.0, particularly lithium bromide.

The process of this invention is conveniently carried out under conditions wherein a basic salt, with or without the addition of the lithium halide, is suspended in a tertiary amide solvent. Water in amounts of up to about 10%, preferably 1 to 10%, of the volume of the tertiary amide is added to the suspension; and under an inert atmosphere, the resulting mixture is heated while a solution of the 3-keto-2,4-dihalogeno steroid is slowly added to the mixture. The heating is continued at about 70° C. to about reflux until dehydrohalogenation is complete.

It is to be noted that the percentage of water in the reaction mixture may be varied over a relatively wide range (surprisingly so in view of the requirement of the prior art processes that anhydrous conditions be maintained); however, when the percentage of water approaches 10% (the upper end of the range) the reaction mixture takes on some of the aspects of an aqueous alkaline solution and hydrolysis of more labile ester functions is a distinct possibility. Should such occur, the product may be re-esterified after the completion of the dehydrohalogenation. It is, therefore, preferred to maintain the water concentration in the range of about 1–4%.

The preferred tertiary amides useful for this invention are such N,N-dialkylacylamides and cyclic amides as dimethylformamide, dimethylacetamide, and N-methyl-2-pyrrolidone, although all such other tertiary amides commonly used in steroidal dehydrohalogenation reactions may conveniently be employed. Although it is preferred to employ about 5–15 ml. of tertiary amide per gram of steroid, any quantity conveniently handled may suitably be employed.

As used herein the term "basic salt" embraces the carbonates and oxides of the alkali metals and the alkaline earth metals, the preferred basic salts being the alkali and alkaline earth metal carbonates, especially the carbonates of lithium, calcium and magnesium. Although it is preferred to employ the basic salts at about one to ten molar equivalents (with about ten being optimal), it is found that the basic salts may be employed at even higher concentrations, said concentrations even going up to about fifteen molar equivalents and thus an overall range for the basic salt concentration (based on quantity of steroid) for the process of this invention is about one to about fifteen.

In those instances wherein it is desired to utilize a lithium halide in the dehydrohalogenation reaction, the halide is advantageously employed at about 0.1 to about 5 molar equivalents; preferably about 3 molar equivalents. In a preferred mode of performing the instant process, calcium carbonate and a lithium halide are effectively employed as reactants in the dehydrohalogenation medium. In another preferred mode, a lithium bromide-lithium carbonate reaction couple is advantageously employed. When so used, the carbonate and the halide are employed in the mole ratios (to steroid) set forth above. The term "lithium halide," as used herein embraces those halides having a molecular weight greater than 26.

The instant process is advantageously carried out at the reflux temperature of the tertiary amide for from about 1 to about 5 hours, preferably in an inert or non-oxidizing atmosphere, such as for example under a nitrogen atmosphere. Lower temperatures such as about 70° C. may be used, but the time required to effect a substantially complete reaction is thereby extended, possibly up to 20 hours.

There are many techniques known in the art to follow the course of dehydrohalogenation processes. We prefer to follow the course of the instant process by monitoring the quantity of the 3-keto-$\Delta^{1,4}$ steroid, preferably by means of ultraviolet analysis. In practice, an aliquot of the reaction mixture is removed at ½ hour intervals during the dehydrohalogenation reaction and the quantity of the 3-keto-$\Delta^{1,4}$ steroid is determined by ultraviolet analysis according to standard and well-known analytical techniques. When the reaction is complete, standard isolation techniques may be used.

As used herein the expression "3-keto-2,4-dihalogeno steroid" embraces in particular compounds of the androstane, etiocholane, cholestane, cholane, stigmastane, pregnane and allopregnane series in addition to compounds capable of being transformed into the foregoing such as the saponins and bile acids; and to compounds derived therefrom such as D-homo and D-nor analogs of the foregoing. Such compounds may have substituents on the A, B, C and D rings such as alkyl groups (e.g. methyl at 16-), oxygen functions (e.g. hydroxyl or ketone at 11-), etc. However, hydrogen atoms must be present at positions 1 and 5 for the desired reaction to occur.

The process of this invention is of particular importance in the dehydrohalogenation of 3-keto-2,4-dihalogeno steroids having a cortical side chain, such as the precursors of prednisone, triamcinolone, dexamethasone, betamethasone, and flumethasone; in particular in the conversion of a 2,4-dibromo-16α- or 16β-methyl-pregnane-17α,21-diol-3,20-dione 21-acetate into 16α- or 16β-methyl-1,4-pregnadiene-17α,21-diol-3,20-dione 21-acetate respectively. All the foregoing have significant physiological activity and also possess a 3-keto-$\Delta^{1,4}$ moiety.

The instant invention is also of utility in the preparation of pregnane compounds of the progestational series (e.g. 1,4-pregnadiene-3,20-dione and 17α-acetoxy-1,4-pregnadiene-3,20-dione) from the corresponding 3-keto-2,4-dihalogeno precursors. Many compounds of this class exhibit progestational and/or anti-inflammatory properties.

Further, the instant invention is also effective for the dehydrohalogenation of 3-keto-2,4-dihalogeno androstanes and etiocholanes to yield the corresponding A-ring dienones. These dienones include many compounds exhibiting androgenic activity.

The following examples are set forth to illustrate the process of this invention and are not to be construed as limiting the scope thereof.

EXAMPLE 1

16α-methyl-1,4-pregnadiene-17α,21-diol-3,20-dione 21-acetate

Add 75 gms. of lithium bromide and 270 gms. of calcium carbonate to a mixture of 1050 ml. of dimethylacetamide and 60 ml. of water and with continuous stirring and under a nitrogen atmosphere heat the resulting suspension to about 120° C. Slowly add a solution of 150 gms. of 2,4-dibromo-16α-methyl-pregnane-17α,21-diol-3,20-dione 21-acetate in 450 ml. of dimethylacetamide and heat the resulting mixture at 120° C. until sample analysis indicates the reaction to be complete (one and a half hours). Cool the reaction mixture to about 37° C., filter it and wash the inorganic salts with three 300 ml. portions of dimethylacetamide. Add the combined filtrate and washes to 10 liters of vigorously stirred ice water to precipitate the product of this example. Filter off the precipitate, and after a thorough water-wash, recrystallize the product from acetone-hexane to yield 76.1 gms. of 16α-methyl-1,4-pregnadiene-17α,21-diol-3, 20-dione 21-acetate.

EXAMPLE 2

16β-methyl-1,4-pregnadiene-17α,21-diol-3,20-dione 21-acetate (A) To 150 ml. of dimethylacetamide add 15 gms. of lithium bromide, 54 gms. of calcium carbonate and 4.5 ml. of water and with continuous stirring and under a nitrogen atmosphere heat the resulting mixture to about reflux temperature. To the heated mixture, slowly (over half an hour) add a solution of 30 gms. of 2,4-dibromo-16β-methyl-pregnane-17α,21-diol-3,20-dione 21-acetate in 75 ml. of dimethylacetamide and continue the heating at reflux temperature until sample analysis indicates the reaction to be complete (2 hours). Cool and filter the reaction mixture; wash the salt cake with four 50 ml. portions of dimethylacetamide, and pour the filtrate and washes into 4.5 liters of vigorously stirred ice water. Extract the desired product with methylene chloride, water-wash and dry (over magnesium sulfate) the methylene chloride extract. Concentrate in vacuo the extract to about 75 ml. Add 250 ml. of ethyl ether and 250 ml. of hexane and distil the resulting mixture until a thick crystal slurry is obtained. Cool the slurry to about 0° C. and hold for about 1 hour. Filter and wash with precooled (0° C.) hexane. Dry the product and obtain thereby 18.7 gms. of 16β-methyl-1,4-pregnadiene-17α,21-diol-3,20-dione 21-acetate.

(B) To 150 ml. of dimethylacetamide add 15 gms. of lithium bromide, 54 gms. of calcium carbonate and 22.5 ml. of water. With stirring and under a nitrogen atmosphere heat the mixture to about the reflux temperature. Add a solution of 30 gms. of 2,4-dibromo-16β-methyl-pregnane-17α,21-diol-3,20-dione 21-acetate in 75 ml. of dimethylacetamide over approximately a 30 minute interval and continue the heating at reflux temperature until sample analysis indicates the reaction to be complete (2 hours). Cool the reaction mixture to about room temperature and filter. Wash the salt cake with four 50 ml. portions of dimethylacetamide and add the filtrate and washes to 4.5 liters of ice water with vigorous stirring. Extract the product with methylene chloride, and wash the methylene chloride with water to remove the co-extracted dimethylacetamide. Dry the extracts over anhydrous magnesium sulfate and distil in vacuo to approximately 75 ml. Add 250 ml. of ethyl ether and 250 ml. of hexane, and distil until a thick crystalline slurry is obtained. Cool the slurry to about 0° C. and hold for about 1 hour. Filter and wash with precooled (0° C.) hexane. Dry the product and obtain thereby 16.8 gms. of 16β - methyl - 1,4-pregnadiene-17α,21-diol-3,20-dione 21-acetate.

EXAMPLE 3

1,4-androstadiene-17β-ol-3-one 17-acetate

Suspend 10 gms. of lithium bromide and 36 gms. of lithium carbonate in 140 ml. of dimethylacetamide and add 4 ml. of water. Provide a nitrogen atmosphere for the reaction mixture and heat with stirring to about 120° C. Over a 30 minute interval, add a solution of 20 gms. of 2,4-dibromoetiocholane-17β-ol-3-one 17-acetate in 60 ml. of dimethylacetamide while maintaining the temperature of the reaction mixture at 120° C. Continue the heating at 120° C. until sample analysis indicates the reaction to be complete (2 hours). Cool the reaction mixture to about room temperature filter. Wash the precipitate with three 50 ml. portions of dimethylacetamide and combine with the filtrate. Add the dimethylacetamide solution to 1.4 liters of ice water with vigorous stirring. Filter off the precipitate, water-wash the solids and dry at 60° C. to obtain 12.2 gms. of crude product. Recrystallize the product from acetone-isopropyl ether to yield 10.9 gms. purified 1,4-androstadiene-17β-ol-3-one 17-acetate.

EXAMPLE 4

1,4-pregnadiene-11β,17α,21-triol-3,20-dione 21-acetate

Suspend 25 gms. of lithium bromide and 30 gms. of magnesium oxide in 350 ml. of dimethylacetamide and add 10 ml. of water. Under a nitrogen atmosphere and with continuous stirring heat the reaction mixture to about 120° C. Dissolve 50 gms. of 2,4-dibromo-pregnane-11β,17α,21-triol-3,20-dione 21-acetate in 150 ml. of dimethylacetamide and add the steroid solution to the reaction mixture over a 30 minute interval while maintaining the temperature of the reaction mixture at about 120° C. Continue the heating at 120° C. until sample analysis indicates the dehydrobromination to be complete (2 hours). Isolate the product in the manner described in Example 3 and recrystallize the crude product from acetone to yield 25 grams of purified 1,4-pregnadiene-11β,17α,21-triol-3,20-dione 21-acetate.

EXAMPLE 5

1,4-pregnadiene-17α, 21-diol-3,11,20-trione 21-acetate

Add 90 gms. of calcium carbonate to a mixture of 350 ml. of dimethylformamide and 5 ml. of water. With continuous stirring and under an argon atmosphere and 23.5 gms. of lithium bromide then heat the suspension to 120° C. Add a solution of 50 gms. of 2,4-dibromo-5β-pregnane-17α,21-diol-3,11,20-trione 21-acetate in 150 ml. of dimethylformamide over a 30 minute period while maintaining the reaction mixture at about 120° C. Follow the procedure set forth in Example 3 and recrystallize the crude product from ethyl acetate-isopropyl ether to yield 25 grams of 1,4-pregnadiene-17α,21-diol-3,11,20-trione 21-acetate.

In accordance with the foregoing procedures, a wide variety of 3-keto-2,4-dohalogeno steroids may be dehydrohalogenated of which the following are exemplary:

2,4-dibromo-9α-chloro-pregnane-11β,17α,21-triol-3,20-dione 21-valerate;
2,4,21-tribromo-pregnane-17α-ol-3,20-dione;
2,4-dibromo-pregnane-11β,17α,21-triol,3,20-dione 21-carbethoxylate;
2,4-dibromo-pregnane-17α-ol-3,20-dione 17-butyrate;
2,4-dibromo-16α-methyl-pregnane-11α,21-diol-3,20-dione 11,21-diacetate;
2,4-dibromo-16β-methyl-pregnane-17α,21-diol-3,11,20-trione 21-hexanoate;
2,4-dibromo-pregnane-11β,17α,21-triol-3,20-dione 21-acetate;
2,4-dibromo-androstane-17β-ol-3-one 17-hexahydrobenzoate;
2,4-dibromo-pregnane-17α-ol-3,20-dione;
2,4-dibromo-cholestane-3-one;
2,4-dibromo-16β-methyl-9(11)-pregnene-17α,21-diol-3,20-dione 21-acetate;
2,4-dibromo-androstane-3,17-dione;
2,4-dibromo-6α-methylpregnane-3,20-dione;
2,4-dibromo-6α,16β-dimethyl-pregnane-3,20-dione;
2,4-dibromo-pregnane-17α-ol-3,11,20-trione;
2,4-dibromo-9α-fluoro-pregnane-11β,16α,21-triol-3,20-dione 16,21-dipropionate;
2,4-dibromo-9α-fluoro-pregnane-11β,15β,21-triol-3,20-dione 15,21-diacetate;
2,4-dibromo-16β-methyl-pregnane-17α,21-diol-3,20-dione 21-acetate;
2,4-dibromo-androstane-17β-ol-3-one 17-acetate;
2,4-dibromo-pregnane-17α,21-diol-3,20-dione 21-benzoate;
2,4-dibromo-pregnane-11β,17α,21-triol-3,20-dione 21-acetate;
2,4-dibromo-pregnane-11α,17α,21-triol-3,20-dione 21-adamantoate;
2,4-dibromo-16β-methyl-6α,9α-difluoro-pregnane-11β,17α,21-triol-3,20-dione 21-carbethoxylate.

The foregoing compounds upon being subjected to substantially the procedures described in the above examples yield the following products:

9(11)-oxide-1,4-pregnadiene-17α,21-diol-3,20-dione 21-valerate;
21-bromo-1,4-pregnadiene-17α-ol-3,20-dione;
1,4-pregnadiene-11β,17α,21-triol-3,20-dione 21-carbethoxylate;
1,4-pregnadiene-17α-ol-3,20-dione 17-butyrate;
16α-methyl-1,4-pregnadiene-11α,21-diol-3-20-dione 11,21-diacetate;
16β-methyl-1,4-pregnadiene-17α,21-diol-3,11,20-trione 21-hexanoate;
1,4-pregnadiene-11β,17α,21-triol-3,20-dione 21-acetate;
1,4-androstadiene-17β-ol-3-one 17-hexahydrobenzoate;
1,4-pregnadiene-17α-ol-3,20-dione;
1,4-cholestadiene-3-one;
16β-methyl-1,4,9,11-pregnatriene-17α,21-diol-3,20-dione 21-acetate;
1,4-androstadiene-3,17-dione;
6α-methyl-1,4-pregnadiene-3,20-dione;
6α,16β-dimethyl-1,4-pregnadiene-3,20-dione;
1,4-pregnadiene-17α-ol-3,11,20-trione;
9α-fluoro-1,4-pregnadiene-11β,16α,21-triol-3,20-dione 16,21-dipropionate;
9α-fluoro-1,4-pregnadiene-11β,15β,21-triol-3,20-dione 15,21-diacetate;
16β-methyl-1,4-pregnadiene-17α,21-diol-3,20-dione 21-acetate;
1,4-androstadiene-17β-ol-3-one 17-acetate;
1,4-pregnadiene-17α,21-diol-3,20-dione 21-benzoate;
1,4-pregnadiene-11β,17α,21-triol-3,20-dione 21-acetate;
1,4-pregnadiene-11α,17α,21-triol-3,20-dione 21-adamantoate;
16β-methyl-6α,9α-difluoro-1,4-pregnadiene-11β,17α,21-triol-3,20-dione 21-carbethoxylate.

We claim:
1. A method for preparing a 1,4-dehydro-3-keto-steroid which comprises heating a 2,4-dihalogeno-3-keto-steroid having hydrogen atoms at positions $C_1$ and $C_5$ in an aqueous medium comprising a tertiary amide selected from the group consisting of N-N-di-lower alkyl lower alkanoyl amides and N-lower alkyl-2-pyrrolidone, a member selected from the group consisting of alkali and alkaline earth metal carbonates and oxides, and water in a volume from about 1% to about 10% that of the tertiary amide, said medium optionally containing a lithium halide having a molecular weight greater than 26.
2. A process according to claim 1 wherein the aqueous reaction medium contains lithium bromide and a member selected from the group consisting of alkali and alkaline earth metal carbonates.

3. A process according to claim 1 wherein the aqueous reaction medium contains lithium bromide and a member selected from the group consisting of alkali and alkaline earth metal oxides.

4. A process according to claim 1 wherein the member selected from the group consisting of alkali and alkaline earth metal carbonates and oxides is present in an amount of about 1.0 to 15 moles per mole of steroid.

5. A process according to claim 1 wherein the lithium halide is present in an amount of about 0.1 to about 5 moles per mole of steroid.

6. A process according to claim 1 wherein the N,N-di-lower alkyl alkanoyl amide is dimethylacetamide.

7. A process according to claim 1 which comprises heating a 2,4-dihalogeno-3-keto-steroid having hydrogen atoms at positions $C_1$ and $C_5$ in an aqueous medium comprising dimethylacetamide, calcium carbonate, lithium bromide and water, said heating taking place within the temperature range of about 70° C. to reflux temperature in an inert atmosphere wherein the water is present in an amount of from about 1% to about 4% of the volume of the tertiary amide.

8. A process according to claim 7 wherein the lithium bromide is present in an amount of about 0.1 to 5 moles per mole of steroid and the calcium carbonate is present in an amount of about 1 to 15 moles per mole of steroid.

9. The process according to claim 8 for dehydrohalogenating 2,4 - dibromo-16β-methylpregnane-17α,21-diol-3,20-dione-21-acetate to produce 16β-methyl-1,4-pregnadiene-17α,21-diol-3,20-dione 21-acetate.

10. The process according to claim 8 for dehydrohalogenating 2,4 - dibromo-16α-methyl-pregnane-17α,21-diol-3,20-dione-21 - acetate to produce 16α-methyl-1,4-pregnadiene-17α,21-diol-3,20-dione-21-acetate.

References Cited

UNITED STATES PATENTS 2,923,721   2/1960   Joly et al. _____ 260—397.3

HENRY A. FRENCH, Primary Examiner

U.S. Cl. X.R.

260—239.55, 397.2, 397.3, 397.4, 397.45, 999